United States Patent [19]
Reilly

[11] Patent Number: 5,390,180
[45] Date of Patent: Feb. 14, 1995

[54] SONET DS-N DESYNCHRONIZER

[75] Inventor: Brian F. Reilly, Hillsboro, Oreg.

[73] Assignee: NEC America, Inc., Melville, N.Y.

[21] Appl. No.: 197,767

[22] Filed: Feb. 16, 1994

Related U.S. Application Data

[63] Continuation-in-part of Ser. No. 127,095, Sep. 27, 1993, Pat. No. 5,311,511, which is a continuation of Ser. No. 774,423, Oct. 10, 1991, abandoned.

[51] Int. Cl.$^6$ .............. H04J 14/08; H04L 7/08
[52] U.S. Cl. .................. 370/84; 370/105.1; 370/105.3; 359/158; 375/118
[58] Field of Search .......... 370/84, 100.1, 102, 370/105.1, 105.3, 108; 375/118; 359/158

[56] References Cited

U.S. PATENT DOCUMENTS

| | | | |
|---|---|---|---|
| 4,191,976 | 3/1980 | Braun | 360/51 |
| 4,792,914 | 12/1988 | Dartois et al. | 364/607 |
| 4,811,340 | 3/1989 | McEachern et al. | 370/102 |
| 4,920,547 | 4/1990 | Murakami | 370/102 |
| 4,928,275 | 5/1990 | Moore et al. | 370/102 |
| 4,933,890 | 6/1990 | Nuytkens et al. | 364/721 |
| 4,941,156 | 7/1990 | Stern et al. | 375/118 |
| 4,975,699 | 12/1990 | Frey | 341/118 |
| 4,996,698 | 2/1991 | Nelson | 370/105.3 |
| 5,008,900 | 4/1991 | Critchlow et al. | 375/8 |
| 5,157,655 | 10/1992 | Hamlin et al. | 370/84 |
| 5,311,511 | 5/1994 | Reilly et al. | 370/84 |

Primary Examiner—Melvin Marcelo
Attorney, Agent, or Firm—Sughrue, Mion, Zinn, Macpeak & Seas

[57] ABSTRACT

A SONET/DS-N desynchronizer and method for receiving an incoming stream of SONET (Synchronous Optical NETwork) data, having a controller for controlling numerically controlled oscillator and clock circuit which provide a desynchronized clock for smoothly adapting the rate at which data is retrieved from a data buffer to the rate at which the incoming SONET data is stored in the data buffer. Pointer adjustments are processed separately from the SONET SPE payload frequency tracking. That is, the processing of pointers, which indicates a change in the phase of the SONET SPE payload, includes detecting negative or positive pointer hits by monitoring, for example, the H1, H2 bytes in the transport overhead, and advancing or retarding the phase over a predetermined period of time. On the other hand, the SONET SPE payload frequency tracking includes detecting positive or negative buffer offsets by monitoring the buffer offset signal OFFSET, and increasing or decreasing, respectively, the tuning word to compensate for the detected positive or negative buffer offset.

17 Claims, 14 Drawing Sheets

DAC OUTPUT

FILTER OUTPUT

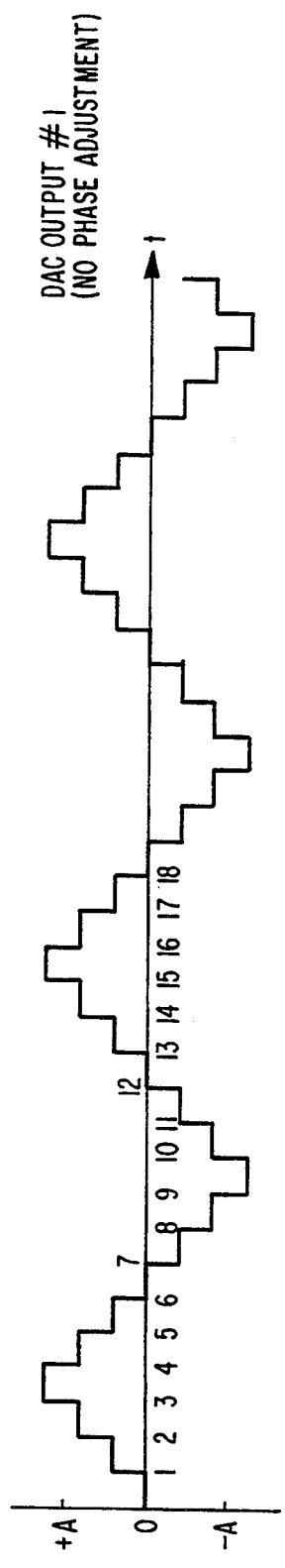
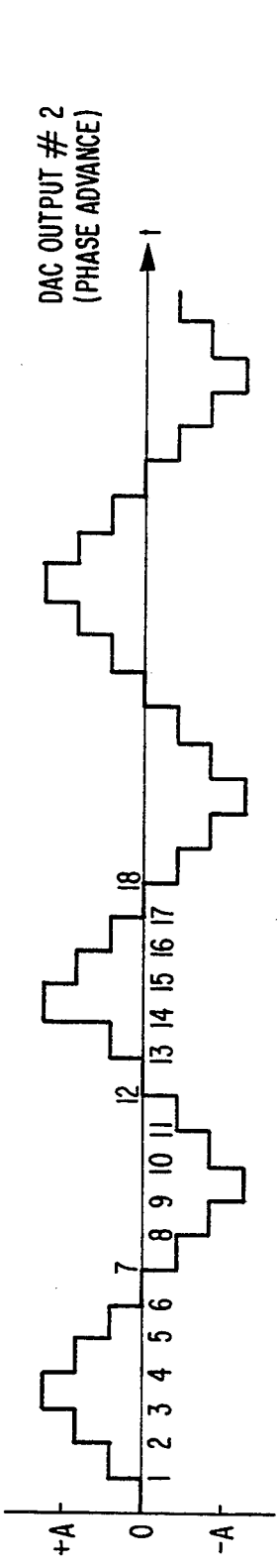
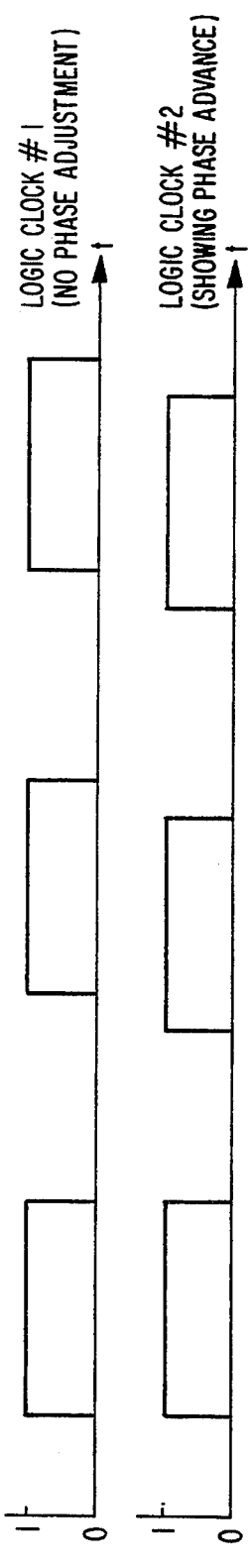
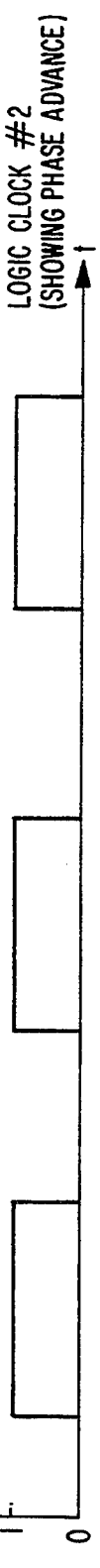
FIG. 14a — DAC OUTPUT #1 (NO PHASE ADJUSTMENT)
FIG. 14b — DAC OUTPUT #2 (PHASE ADVANCE)
FIG. 14c — LOGIC CLOCK #1 (NO PHASE ADJUSTMENT)
FIG. 14d — LOGIC CLOCK #2 (SHOWING PHASE ADVANCE)

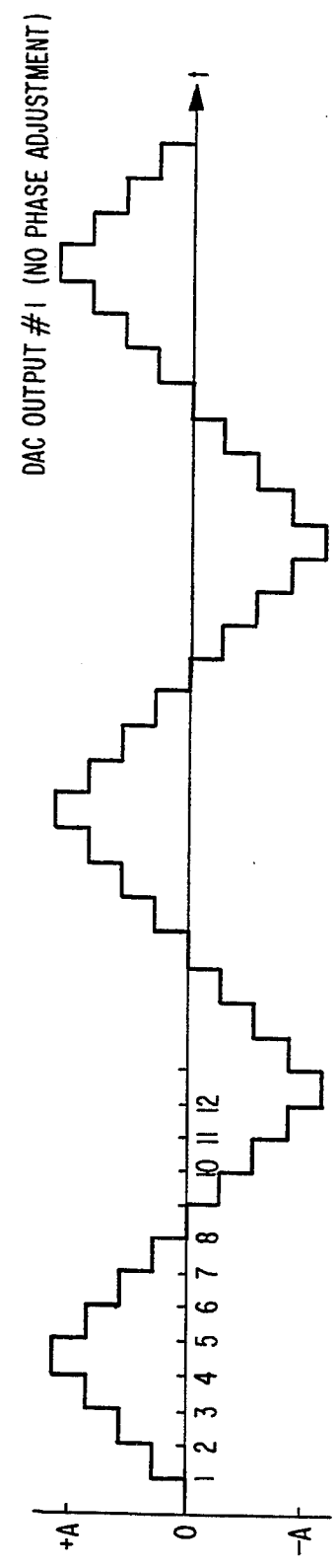
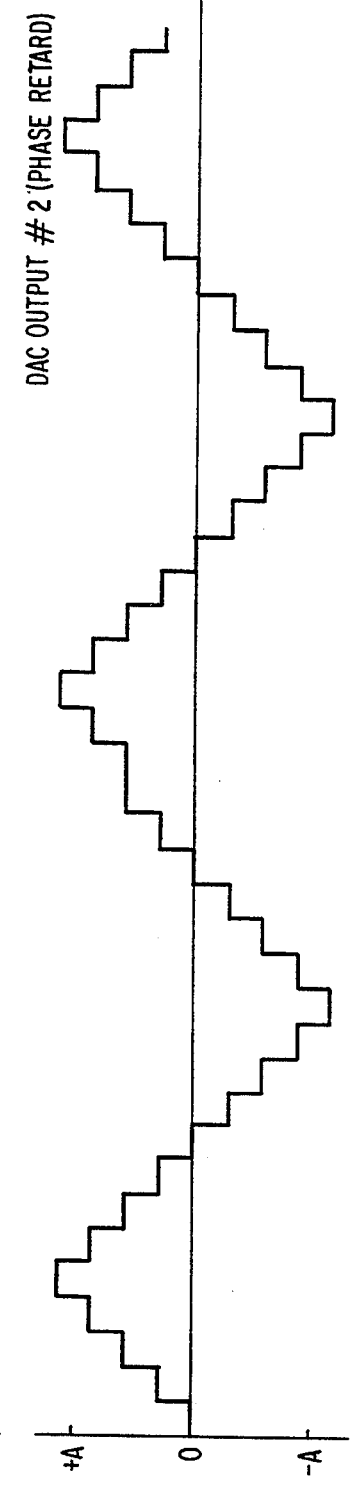
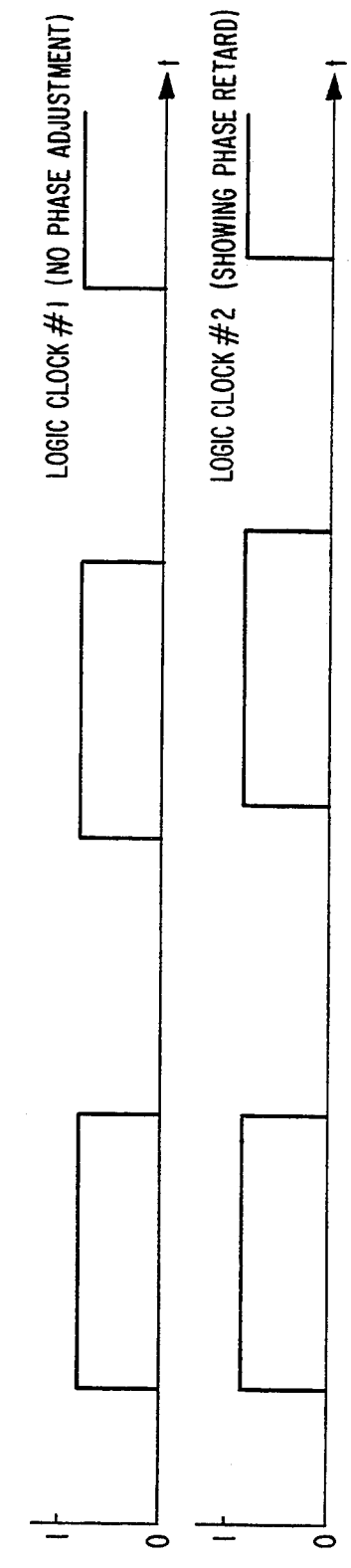
FIG. 15a DAC OUTPUT #1 (NO PHASE ADJUSTMENT)
FIG. 15b DAC OUTPUT #2 (PHASE RETARD)
FIG. 15c LOGIC CLOCK #1 (NO PHASE ADJUSTMENT)
FIG. 15d LOGIC CLOCK #2 (SHOWING PHASE RETARD)

SONET DS-N DESYNCHRONIZER

This is a continuation-in-part of application Ser. No. 127,095, filed Sep. 27, 1993, now U.S. Pat. No. 5,311,511, which is a continuation of application Ser. No. 774,423, filed on Oct. 10, 1991, (now abandoned).

BACKGROUND OF THE INVENTION

The present invention relates in general to an apparatus for receiving an incoming stream of a SONET (Synchronous Optical NETwork) payload envelope (SPE) and, more particularly, to a microcontroller for controlling a circuit that provides a desynchronized clock for smoothly adapting the rate at which DS-N data is retrieved from a data buffer to the rate at which the incoming SONET data is stored in the data buffer.

In telephone communications, in the past, data was carried exclusively over metallic media such as twisted pair and coaxial cable. Over metallic media, data is transferred at a speed or line rate of various levels. For example, the human voice can be carried as a digital signal at a line speed of 64 kilobits per second (kbps). For this line speed, the voice signal must be sampled 8,000 times each second, and using pulse code modulation, each voice value is carried as an eight-bit sample. This 64 kbps rate is called the Digital Signal level 0, or DS-0, rate. Higher rates, such as DS-1, DS-2, DS-3, ... DS-N also exist, and are described in the International Telegraph and Telephone Consultative Committee (CCITT) Recommendations G.703. However, the speed at which data is transferred over metallic media is limited. To overcome this limitation, optical fiber media have been developed, which can accommodate, much higher line speeds, and hence can transfer much more information in a given period of time.

For optical fiber transmission systems, the SONET standard defines a line rate hierarchy and frame format. SONET is an American National Standards Institute (ANSI) specification for a high-speed digital hierarchy for optical fiber communications, and is described in detail in ANSI T1.105 and T1.106.

The SONET TDM hierarchy is based upon transmission building blocks of 51.84 bits per second (Mbps) each. The 51.84 Mbps rate is called the Synchronous Transport Signal level 1 (STS-1). Subsequent rates or levels STS-N are all multiples of the basic rate of 51.84 Mbps, for example, the STS-3 rate is 155.52 Mbps.

That basic unit of transport is the STS-1 frame, which as shown in FIG. 1, is organized into nine rows of 90 bytes or 810 bytes per frame. Each frame is generated 8,000 times per second (8 KHz), thus, yielding the 51.84 Mbps STS-1 rate (i.e., 8000 frames/second , * 810 byes/frame , * 8 bits/byte).

The first three columns of each frame provide Transport Overhead (TOH) information for providing operations, administration, maintenance, and provisioning control type functions. The remaining 87 columns (i.e., 873 bytes) include the STS-1 Envelope Capacity or Synchronous Payload Envelope (SPE) .

Each row of the SPE begins with a Path Overhead (POH) byte which is also used for operations, administration, maintenance, and provisioning control type functions. The remaining 774 bytes are free for transporting voice/data signals. Although exactly one STS-1 SPE can fit into one STS-1 frame (including the TOH and POH data bytes), an SPE will usually begin in one STS-1 frame and end in the next. In other words, the SPE does not occupy a fixed position within the STS-1 frame, but rather "floats", and thus spans into two frames.

In theory, the frequency of an STS-1 frame should maintain a frequency of 8 KHz throughout the synchronous optical network (i.e., from source to destination). However, for many reasons including the fact that different regions employ different timing references, SONET connections are not truly synchronous.

The SONET standard, however, provides a ten-bit pointer H1 and H2 as a rate adaption mechanism to compensate for different timing references. That is, the position of the first byte J1 of the SPE within an STS-1 frame is given by the ten-bit pointer H1 and H2, which is transferred in the TOH section. The pointer H1 and H2 provides the offset in number of bytes from their position in the TOH section to the first SPE byte J1.

Consider, for example, a SONET multiplexer where an incoming data tributary has a data rate (or frequency) that is higher than its nominal value, which is equivalent to the case where the multiplexer transmits with a frequency lower than the nominal. The tributary data will "pile up" at the multiplexer (i.e., data overrun) since the data from the SONET source is arriving faster than the multiplexer is transmitting it to the DS-N system. To prevent data overruns, the multiplexer will occasionally begin an SPE cycle one byte time earlier than usual. Such an action is referred to as a negative pointer adjustment, and results in the SPE being repositioned one byte earlier than its previous position relative to the STS-1 frame. On the other hand, when the data tributary has a lower than nominal frequency or the multiplexer transmits with a higher than nominal frequency, the multiplexer performs a positive pointer adjustment from time to time to avoid a data underrun.

FIG. 2 shows a block diagram of an "end-to-end" connection of DS-N type equipment. There is shown a transmitter which includes DS-N type equipment coupled to a SONET transmitter which includes a DS-N synchronizer and an Optical Interface. The SONET transmitter is coupled by optical filter to a SONET receiver, which is composed of an optical interface and DS-N desynchronizer; the desynchronizer being the focus of the invention described herein. Finally, the received and desychronized signal is received by the DS-N type receiving equipment.

In more specific terms, the transmitting equipment maps a DS-N signal to a SONET SPE portion of an STS-N frame, which is commonly referred to as "asynchronous DS-N mapping." The synchronizer synchronizes the operation of the connected DS-N equipment to the SONET equipment. On the other hand, the desynchronizer circuit on the receiving side recovers the DS-N signal from the SPE within the STS-N frame.

As an example, the asynchronous mapping standard for a DS-3 signal to a STS-1 signal provides a rate adaption mechanism for compensating for the different tolerances between the SPE at the STS-1 rate and the DS-3 rate. That is, the DS-3 signal has a nominal bit rate of 44.736000 Mbps, with a tolerance of ±20 ppm, whereas, the STS-1 signal has a nominal bit rate of 51.840000 Mbps, with a tolerance of ±4.7 ppm.

To adapt the DS-3 signal to the STS-1 signal, stuff bits (S-bits) are provided in each row of the SPE. Therefore, on average, the synchronizer will stuff two out of three bits, that is, one out of every three bits will contain DS-3 data that must be recovered to properly adapt the DS-3 signal to the STS-1 signal.

On the receiving end, the desynchronizer must recover or extract the DS-N data from the SPE of the STS-1 frame and provide the same to the DS-N equipment. In so doing, the desynchronizer must minimize jitter and avoid, if possible, buffer spills (i.e., data overrun and underruns) which occur when the receiving equipment is unable to match the frequency of its desynchronization clock to the rate of the incoming DS-N data. As stated above, buffer spills can occur due to SONET lines connected between different regions employing different timing references.

Jitter results because of at least two factors. First, the variation in the S-bit stuffing ratio and by pointer H1 and H2 adjustments. Both of these factors contribute to the variation in the rate at which the data buffer fills and empties, which in turn causes the desynchronizer to speed up or slow down.

It is, therefore, a function of the desynchronization circuit to smoothly adapt the rate of the outputting DS-N data sent to the DS-N type receiving equipment to the rate of the incoming SONET SPE data.

Desynchronizers which recover DS-N data from an SPE are known. For example, U.S. Pat. No. 4,996,698 to Nelson shows an apparatus for and method of integrating large phase hit error signals (which occur due to pointer adjustments) in a clock smoothing process to reduce jitter in the smoothed clock output. Nelson discloses a high pass filter and a summing circuit for filtering the large phase hit signal, and summing it with a periodically discontinuous clock. The summed result is then applied to a phase detector and second filter to produce a control signal which is applied to a voltage controlled oscillator. The output of the voltage controlled oscillator provides a continuous clock signal representing the smoothed clock.

The desynchronizer disclosed in Nelson, however, presents several disadvantages. First, the voltage controlled oscillator does not permit very fine resolution control of the frequency in comparison to a digital frequency control device, nor does it permit very precise frequency tuning. Secondly, a voltage controlled oscillator requires "tweaking" at the time of manufacture, whereas a digital implementation does not.

U.S. Pat. No. 4,941,156 to Stern et al. relates to a jitter attenuation circuit. Specifically, Stern et al. discloses a FIFO which receives data that is synchronized with a write clock and puts out data in synchronism with a read clock. The read clock is synchronized with the write clock by a phase locked loop. The phase locked loop contains a digitally controlled linear oscillator, wherein the phase detector provides a quantized output to incrementally step the digitally controlled oscillator up or down in frequency to track the write clock while attenuating jitter.

The circuit disclosed in Stern et al. generally has similar disadvantages as the apparatus disclosed in Nelson. Furthermore, the digitally controlled oscillator responds to only the difference between the write address and read 15 address, which does not provide an acceptable response to SONET data transmission circuits, particularly with large phase hit errors (i.e., pointer adjustments).

SUMMARY OF THE INVENTION

Accordingly, it is a general object of the present invention to provide a desynchronized clock for smoothly adapting the rate at which data is retrieved from a data buffer to the rate at which an incoming stream of SONET data is stored in the buffer and which is free of the above-mentioned problems and disadvantages.

It is also an object of the present invention to provide a desynchronizer including a direct digital synthesis circuit which provides low intrinsic phase noise (i.e., jitter), control of the frequency and phase entirely in the digital domain with very fine resolution, very precise turning control of the frequency, no "tweaking" at the time of manufacture, and the ability to be controlled with a microprocessor or microcontroller.

It is a further object of the present invention to provide a microcontroller and firmware to control the control loop using either a linear, non-linear, or fuzzy logic control implementation.

In accordance with the above and other objects, the present invention provides an apparatus for receiving a stream of SONET data including overhead information and a SONET SPE payload for desynchronizing the SONET SPE payload to a DS-N type data. The apparatus includes first counting means for generating a first count in synchronism with a first clock having a first frequency, second counting means for generating a second count in synchronism with a desynchronized clock having a second frequency, buffer means, coupled to the first and second counting means, for storing the SONET SPE payload at a location corresponding to the first count in synchronism with the first clock, and for outputting DS-N type data from a location corresponding to the second count in synchronism with the desynchronized clock, offset means, coupled to the first and second counting means, for determining a difference between the first count and the second count, and for outputting an offset signal representative thereof, pointer adjustment means, responsive to the overhead information, for monitoring pointer adjustments, and for outputting a count signal representative of the pointer adjustments accumulated over a predetermined period of time, clock generating means, responsive to a control signal, for generating the desynchronized clock, and control means, coupled to the offset means and pointer adjustment means, for generating the control signal in response to the offset signal and the count signal so as to adjust the second frequency of the desynchronized clock such that the difference between the first and second count is maintained at a predetermined value.

Further, in accordance with the above objects, and according to a preferred embodiment of the present invention, the control means includes a numerically controlled oscillator responsive to control signals, including a tuning word and phase offset signal, for producing a signal having a variable frequency, an oscillator for generating a signal having a predetermined frequency, a mixer for producing the desynchronized clock having the second frequency which is equivalent to the summation of the variable frequency and the predetermined frequency, wherein the control signal is varied to adjust the variable frequency such that the second frequency of the desynchronized clock is adjusted to maintain the difference between the first count and the second count at a predetermined value.

Yet further, the present invention provides an apparatus for receiving a stream of SONET data including overhead information and a SONET SPE payload for desynchronizing the SONET SPE payload to a DS-N type data, comprising first clock means for generating a first clock having a first frequency, second clock means for generating a desynchronized clock having a second frequency, buffer means, coupled to the first and second clock means, for storing the SONET SPE payload in synchronism with the first clock, and for outputting DS-N type data in synchronism with the desynchronized clock, offset means for determining a degree of fullness of the buffer, and for outputting an offset signal representative thereof, pointer adjustment means, responsive to said overhead information, for monitoring pointer adjustments, and for outputting a count signal representative of the pointer adjustments accumulated over a predetermined period of time, and control means, coupled to said offset means and pointer adjustment means, for generating a control signal in response to said offset signal and said count signal so as to vary said second frequency of said desynchronized clock such that said buffer maintains a predetermined degree of fullness.

The above and other objects, features, and advantages of the present invention will become more apparent from the following detailed description taken in conjunction with the accompanying drawings.

BRIEF DESCRIPTION OF THE DRAWINGS

FIGS. 14a–14d are timing diagrams illustrating advanced phase adjustments of the SONET/DS-N desynchronizer circuit of FIG. 12.

FIGS. 15a–15d are timing diagrams illustrating retarded phase adjustments of the SONET/DS-N desynchronizer circuit of FIG. 12.

DESCRIPTION OF THE PREFERRED EMBODIMENTS

Figure 1:
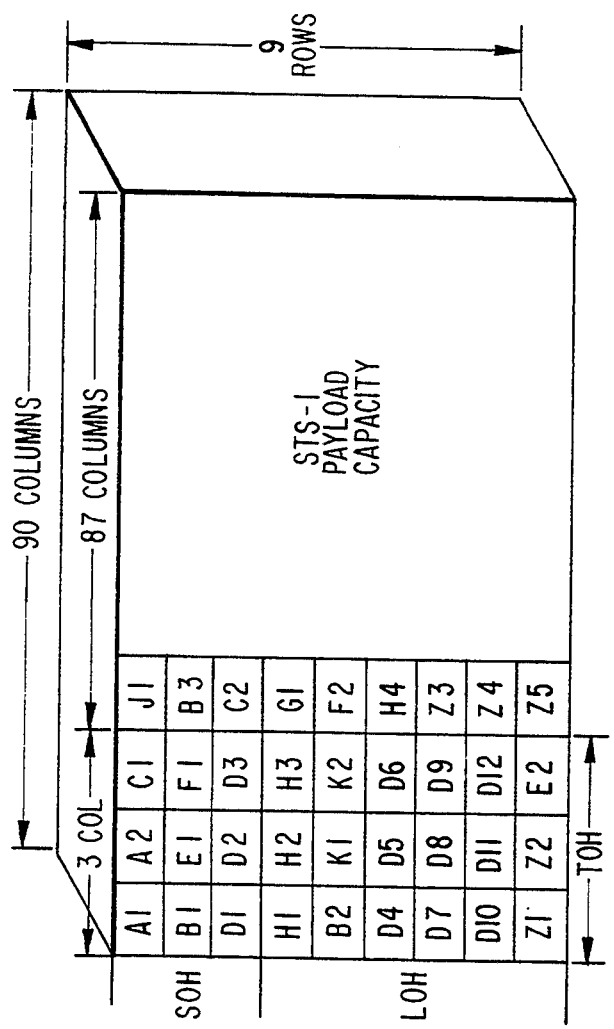
FIG. 1 shows an STS-1 frame in conformance with the SONET standard.
Figure 2:
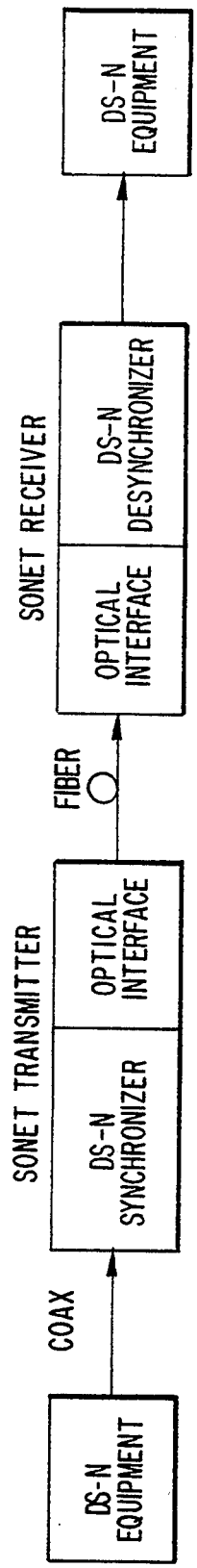
FIG. 2 shows an end-to-end connection of DS-N type equipment.
Figure 3:
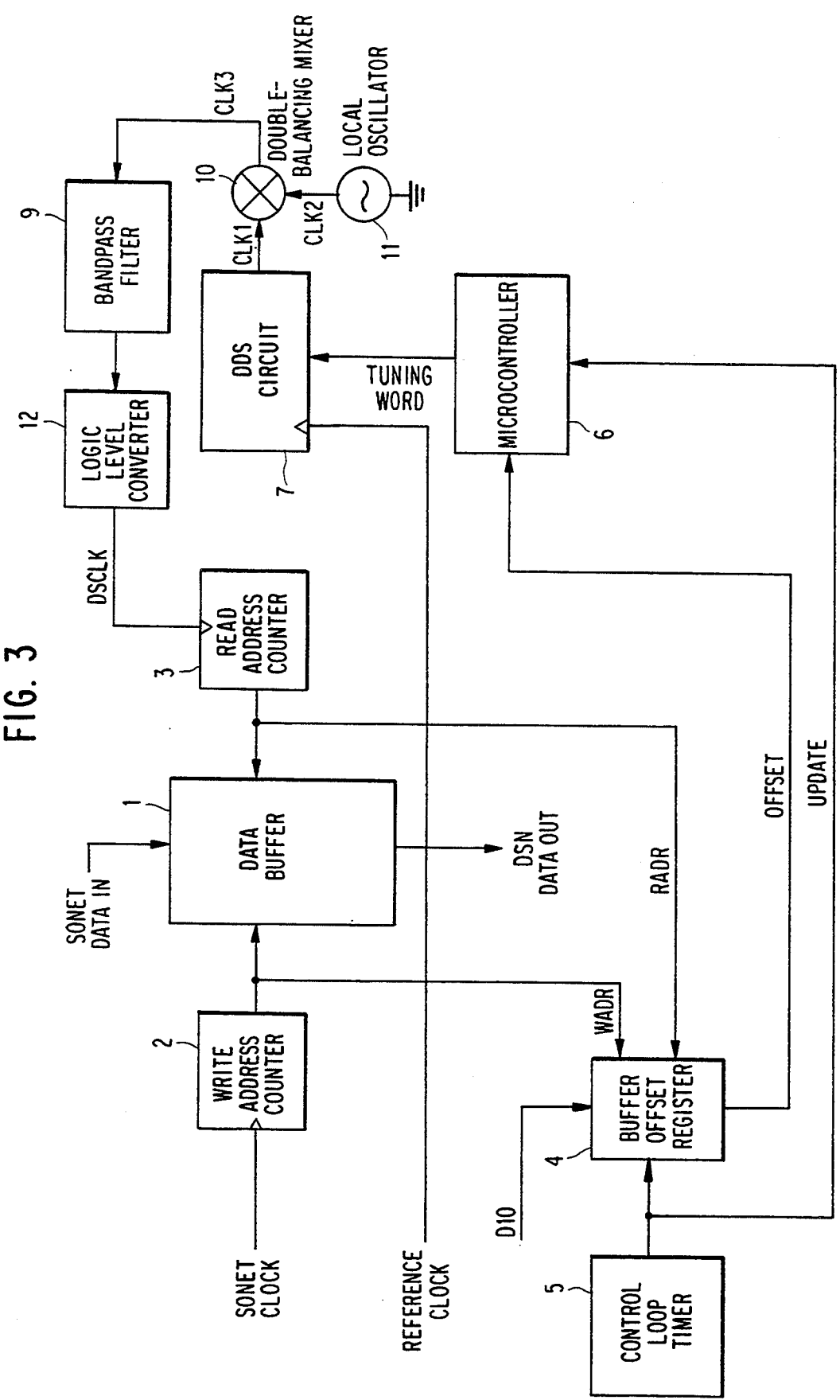
FIG. 3 shows a block diagram of a first preferred embodiment of a SONET/DS-N desynchronizer circuit in accordance with the present invention.

With reference to FIG. 3, there is shown a block diagram of the SONET/DS-N desynchronizer circuit in accordance with the present invention. A burst of data applied to an input of a data buffer 1 includes the Synchronous Payload Envelope (SPE) within an STS-1 frame. The overhead information, namely, the section overhead, line overhead, and path overhead, transferred within an STS frame has previously been extracted by a SONET demultiplexer (not shown). In general, the SPE data is written or read from the data buffer 1 at locations determined by a write address counter 2 and a read address counter 3. The write address counter 2 generates and outputs write address data WADR to the data buffer 1 in synchronism with a SONET clock which originates from a high accuracy distributed reference clock. Similarly, the read address counter 3 generates and outputs read address data RADR to the data buffer in synchronism with a desynchronized clock DSCLK.

Figure 4:
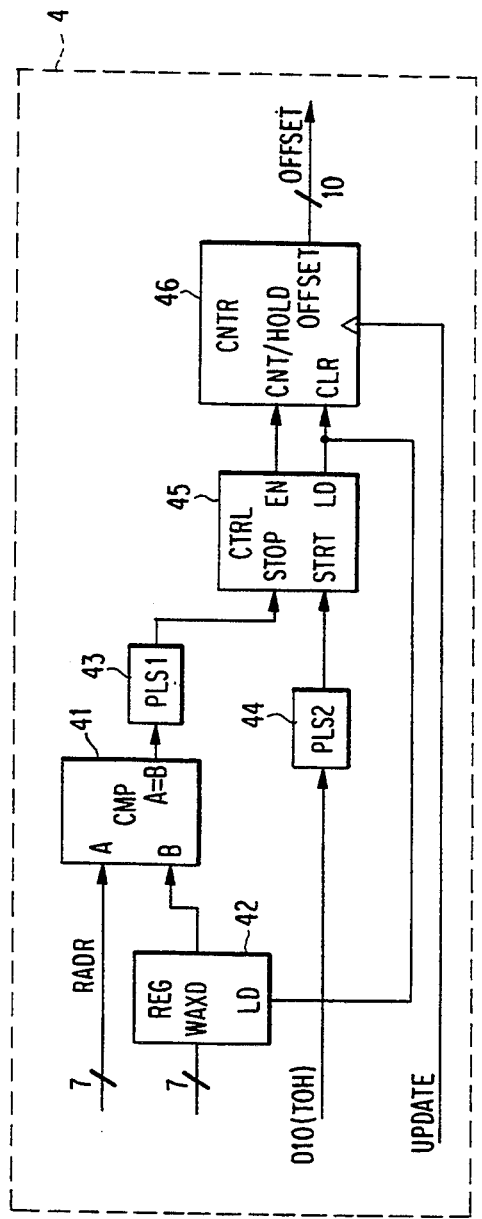
FIG. 4 shows a detailed block diagram of the buffer offset register of FIG. 3.

The respective outputs RADR and WADR of the read and write address counters 2 and 3 are also applied to and sampled by a buffer offset register 4, which is shown in more detail in FIG. 4. Upon each assertion of an update signal UPDATE, which is supplied by a control loop timer 5, the buffer offset register 4 provides an offset signal OFFSET indicative of the difference between the write address data WADR and the read address data RADR.

The frequency adjustment algorithm is designed to maintain the signal OFFSET at a predetermined value, which is the "setpoint" of the control loop. Typically, this requires adjusting the frequency so that the read address lags one-half the buffer length behind the write address.

A microcontroller 6 receives as inputs the offset signal OFFSET from the buffer offset register 4 and the update signal UPDATE from the control loop timer 5 for providing a tuning word signal 7. In response to the tuning word signal, which indicates whether the period of the DDS clock should increase, decrease or stay the same, and a DDS reference clock, the DDS circuit 7, which is shown in greater detail in FIG. 5, generates and outputs to a first input of a mixer 10 a clock signal CLK1 having a frequency $f_1$. A second input of the mixer 10 is coupled to an output of an oscillator 11 which provides another clock signal CLK2 having a frequency of $f_2$. While the frequency of the oscillator's output remains steady, the frequency of the output from the DDS circuit is adjusted either up or down to compensate for variations in the incoming data rate.

The mixer 10 combines the two clock signals CLK1 and CLK2 to produce an output clock signal CLK3 having a frequency $f_3$ equal to the sum (i.e., upper sideband $f_1 + f_2$) of the input frequencies $f_1$ and $f_2$ of the clock signals CLK1 and CLK2 and to the difference (i.e., lower sideband $f_2 - f_1$) of the input frequencies $f_1$ and $f_2$. In this preferred embodiment, the upper sideband is selected because $f_1$ equals 1.736 MHz and $f_2$ equals 43 MHz. However, if $f_2$ is greater than 44.736 MHz, then the lower sideband would be selected. The clock signal CLK3 is then applied to a bandpass filter 9 and to a logic level converter 12 which provides the desynchronizer clock signal DSCLK or frequency $f_3$ to the read address counter 3 clock input.

For purposes of illustration, a SONET/DS-3 desynchronizer is considered, wherein the nominal rate of the DS-3 signals is 44.736 Mbps. That is, for a SONET/DS-3 desynchronizer, the frequency $f_3$ of the clock signal CLK3 ideally should equal 44,736 MHz. To minimize costs, a 44.736 MHz clock is not directly synthesized, as theoretically this would require a DDS reference clock of a frequency of at least two times 44.736 MHz, and in practice about 110 MHz. Instead, a low speed clock (approximately 2 MHz) is directly synthesized and then heterodyned up to 44.736 MHz. Specifically, for the SONET/DS-3 desynchronizer, the local oscillator clock signal CLK3 is selected to have a frequency $f_2$ of 43 MHz. The clock signal CLK1 is selected to have a frequency $f_2$ of 1,736 MHz. Therefore, the upper sideband (i.e., sum of frequencies $f_1$ and $f_2$) will be at a frequency of 44.736 MHz, which is the nominal rate of a DS-3 signal. The DDS circuit 7 can then be tuned to frequencies slightly above or below the 1.736 MHz frequency to adapt the desynchronizer to the incoming data rate.

As stated above, the tolerance of the desynchronized DS-3 clock DSCLK is specified by Bellcore standards to be 44.376 MHz±20 ppm, which is approximately ±895 Hz. This tuning range is easily achieved by the DDS circuit 7.

With reference now to FIG. 4, the buffer offset register 4 is shown in greater detail. The read address signals RADR from the read address counter 3 are applied to a first input A of a comparator 41. The write address signals WADR are applied to an input of a register 42 whose output is coupled to a second input B of the comparator 41. An output A=B of the comparator 41 is coupled to a pulse generator 43 whose output is coupled to a stop input STOP of a controller 45. A start input STRT of the controller 45 is coupled to a signal D10 via a second pulse generator 44. The signal D10 is also coupled to load inputs LD of the register 42 and controller 45 and to a clear input CLR of a counter 46. The signal D10 is used as a timing reference point and is based on the byte D10 from the TOH section of the STS-1 frame. An enable output EN of the controller 45 is coupled to a CNT/HLD input of the counter 46. An output of the counter 46 supplies the offset signal OFFSET, which is applied to an input of the microcontroller 6 each time the signal UPDATE, which is coupled to a clock input of the counter 46, is asserted.

The signal OFFSET indicates how far the read counter is behind the write counter. When the signal D10 is asserted, the counter 46 is cleared, the write address data WADR is registered by the register 42, and the counter 46 is enabled to begin counting. When the read address data RADR equals the write address data WADR, the output A=B of the comparator 41 is asserted, causing the counter 46 to stop counting, which now outputs the offset signal OFFSET until the next signal D10 is asserted.

Figure 5:
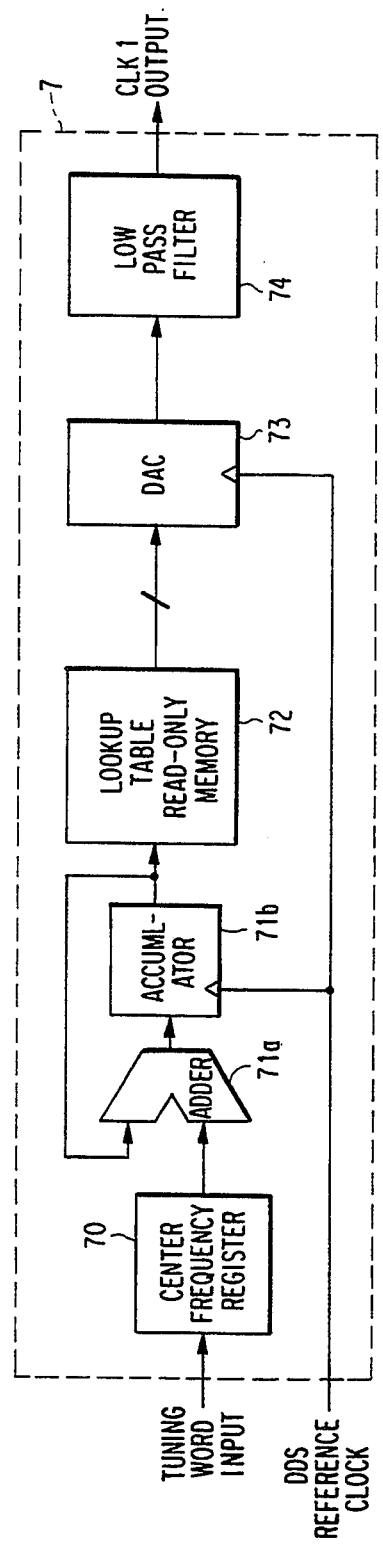
FIG. 5 shows a detailed block diagram of the direct-digital synthesizer circuit of FIG. 3.

Referring now to FIG. 5, there is shown a block diagram of the DDS circuit. The frequency adjustment output signal or tuning word signal of the microcontroller 6 is coupled to an input of a center frequency register 70. The register 70 holds and outputs the same value for the tuning word for a period of each reference clock cycle. The output of the register 70 is coupled to a first input of a binary adder 71a. A second input of the binary adder 71a which is coupled to the output of an accumulator 71b, which output is also coupled to an input of a look-up table read only memory (LUT ROM) 72. The output of the binary address 71a, which supplies the summation of the first and second inputs, is coupled to an input of an accumulator 71b, which retains the value for each reference clock period. The binary address 71a and accumulator 71b are each located within a phase accumulator 71. During each reference clock cycle, the new phase value is calculated by adding the tuning word to the previous phase value. Hence, the value of the tuning word determines the rate at which the phase advances in each cycle, so that the output waveform increases in frequency. The tuning resolution of the output frequency is $f_{ref}/2^N$, where N is the number of bits in the phase accumulator output.

Figure 6A:
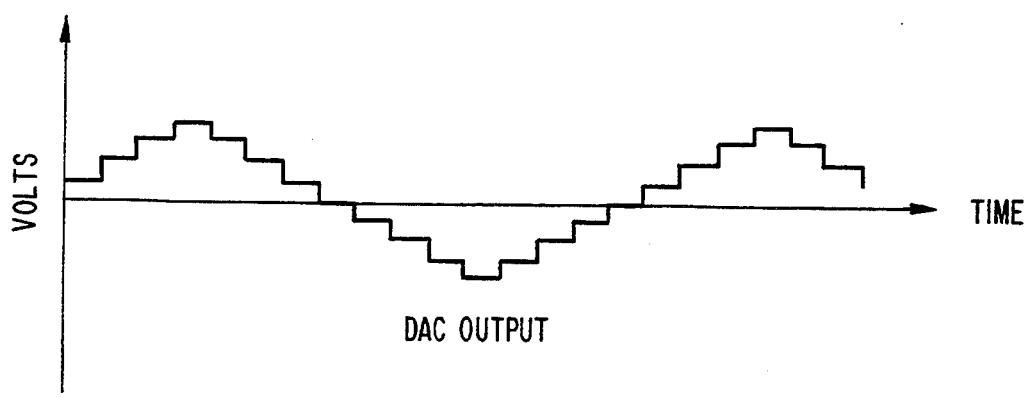
FIGS. 6A and 6B, respectively illustrate waveforms of the digital-analog converter and low pass filter of FIG. 5.
Figure 6B:
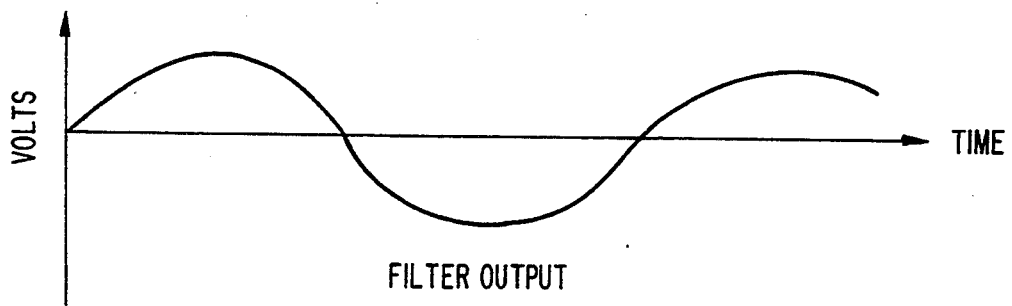

The LUT ROM 72 puts out a signal which corresponds in either voltage or current to the magnitude of the accumulator's output and which is applied to a digital-analog converter (DAC) 73. The output of the DAC 73, which is coupled to the input of a low pass filter 74, supplies for each period of the DDS reference clock a stair-stepped approximation to a desired waveform, as illustrated in FIG. 6A. The low pass filter 74 smooths the input to that which is shown in FIG. 6B, thus providing the clock signal CLK1.

The microcontroller 6 implements in firmware the logic for generating the tuning word or frequency adjustment signal for controlling the DDS circuit. There are three implementations available, namely, a linear controller, non-linear controller, and a fuzzy logic controller, all of which are discussed herein. First, however, a general overview of the steps performed by the microcontroller 6 will be described with reference to FIG. 7.

Figure 7:
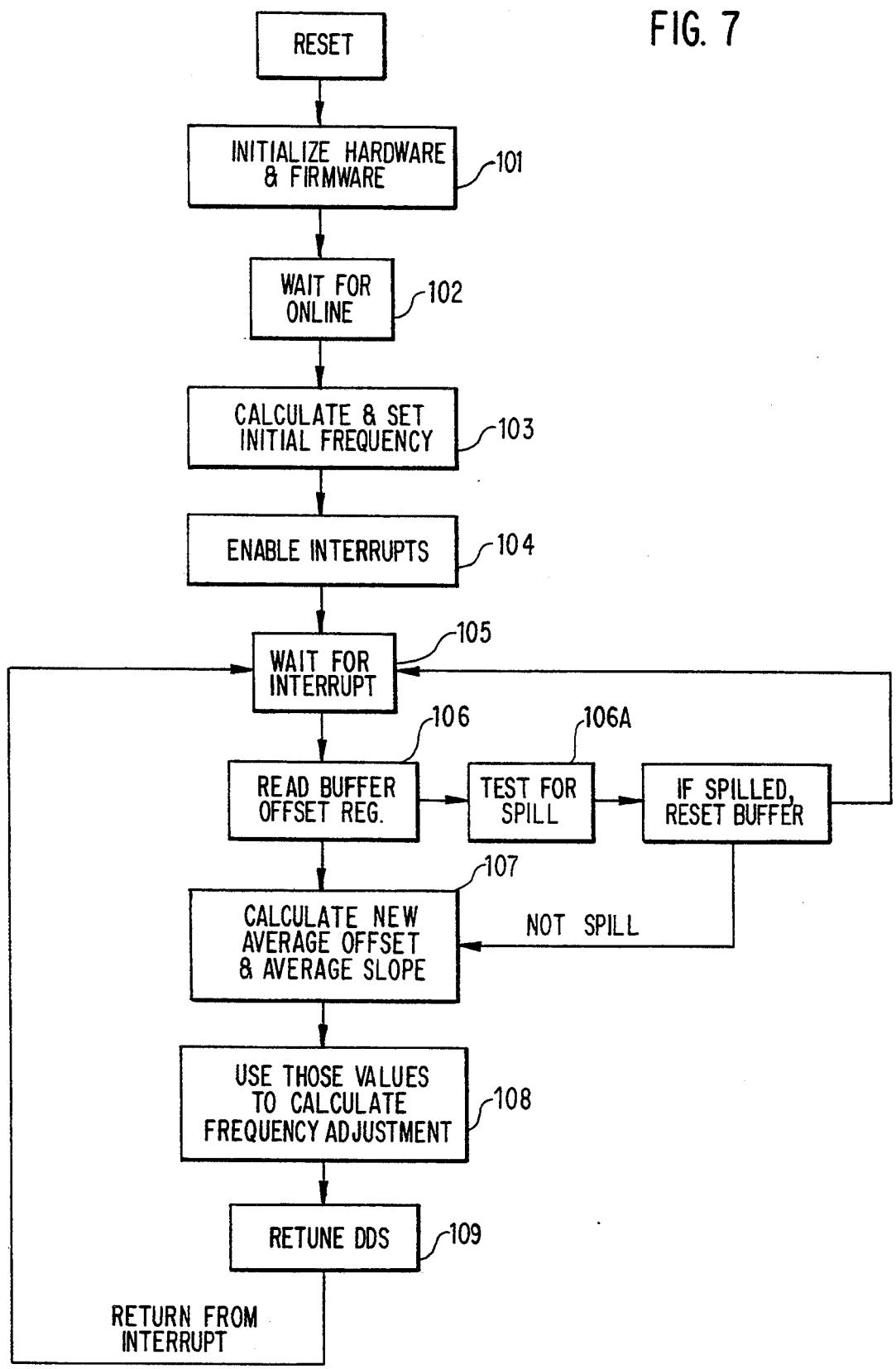
FIG. 7 illustrates a flow chart of the algorithm performed by the controller of FIG. 3.

In FIG. 7, a flow chart illustrating the steps generally performed by the microcontroller 6 is shown. Upon a reset 100, the process flows to steps 101–104 which relate to initialization procedures. In step 101, the hardware and firmware (e.g., software parameters, pointers, etc.) are initialized. In addition, a diagnostic routine is performed to determine proper functioning of the equipment. In step 102, the firmware waits to be configured to an "on-line" mode. In step 103, an initial frequency, that is, the frequency at which the read address counter 3 generates an output, is calculated. Finally, interrupts are enabled and the process moves to the main body of the routine.

In step 105, the firmware waits for an interrupt which occurs periodically, for example, every 9 ms. On the occurrence of an interrupt, the process proceeds to step 106 where the buffer offset register 4 is read, retrieving the signal OFFSET which, again, represents the difference between the write address data WADR and the read address data RADR. Next, in step 106a, a determination is made as to whether the buffer has spilled, that is, whether the read address crossed over the write address (data underrun), or has the write address crossed over the read address (data overrun). If a spill has occurred, the buffer 1 is reset in step 106B and the process returns back to step 105 to wait for the next interrupt. On the other hand, if a spill has not occurred, the process moves on to steps 107–109.

In step 107, a new (or updated) average offset and average slope are calculated. The average offset is simply the average of a predetermined number (e.g., eight) of past offset values retrieved from the buffer offset register 4. The average slope, which provides the rate of change (i.e., first derivative) is the difference between the most recent offset value retrieved from the buffer offset register 4 and the least recent (i.e., the eight oldest) offset value retrieved from the buffer offset register 4.

Step 108 is implemented in accordance with one of the three methods of implementations. In general, however, the frequency adjustment or tuning word is calculated, and applied to the DDS circuit in step 109. Finally, the process returns to step 105 to repeat the above steps 106–109 upon the next occurrence of the interrupt.

Figure 8:
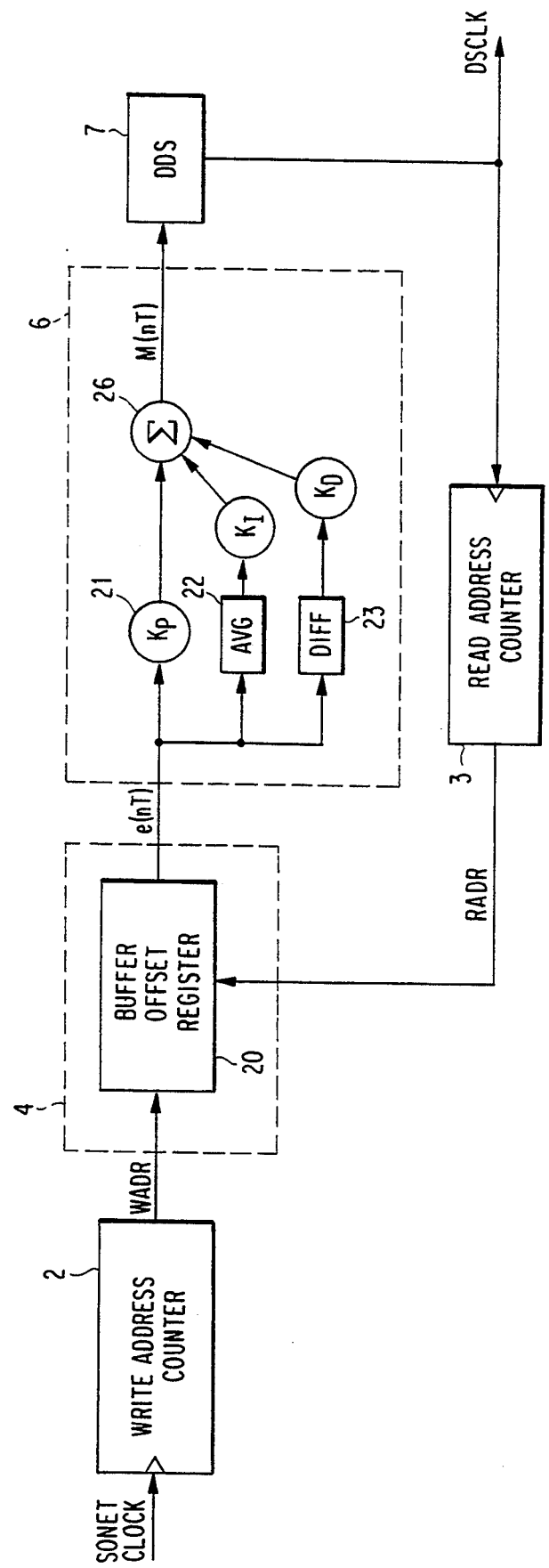
FIG. 8 illustrates a model of a linear controller.

Referring to FIG. 8, there is shown a "Proportional-Integral-Differential" (PID), which logically illustrates the algorithm for the linear controller. An error signal e(nT) is applied to an input of the microcontroller 6, and a frequency adjustment output signal m(nT) of the microcontroller is applied to the DDS circuit 7.

The error signal e(nT), which actually is the offset signal OFFSET, is generated by a subtractor 20, which is located within the buffer offset register 4, and equals the difference between the write address data WADR and the read address data RADR. The frequency adjustment signal m(nT) or tuning word is a function of the present value of the offset signal, average offset value over a predetermined number of previous samples (e.g., eight), and the rate-of-change of the offset value over the sample history that is used to compute the average offset (e.g., the last eight samples). The frequency adjustment signal m(nT) equals the sum 26 of the error signal e(nT) times a scaling factor $k_p$, the average value of the error signal e(nT) times a scaling factor $K_1$, and the rate-of-change of the error signal e(nT) times a scaling factor $k_D$. The scaling factors $K_p$, $K_1$, and $K_D$ are respectively indicated in FIG. 8 at reference numerals 21, 24 and 25. The average and rate-of-change are illustrated by blocks 22 and 23, respectively. The frequency adjustment signal m(nT) is best defined by the following equation:

$$m(t) = K_P e(t) + K_I \int_0^{T_i} e(t)dt + K_D \frac{de(t)}{dt}$$

wherein $T_i$ is the time interval over which the average and the slope are calculated.

Figure 9A:
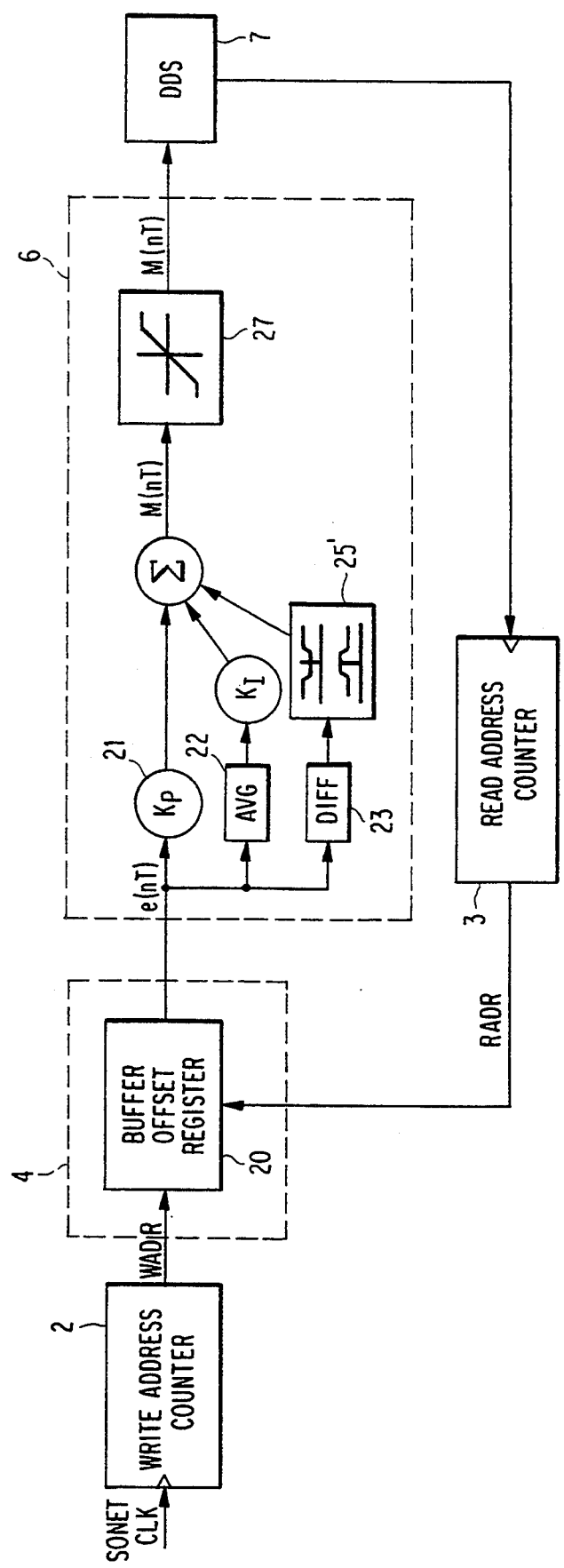
FIG. 9A illustrates a model of a linear controller.

The non-linear implementation is shown in FIG. 9A and is similar to the linear implementation except for the scaling constant $K_D$ 25' and the addition of an application curve 27. In the linear controller, the scaling factor $K_D$ 25 is simply a constant, whereas in the non-linear controller, the scaling factor $K_D$ 25' (also called a damping factor) depends on the average offset and the sign of the slope (first derivative). That is, the scaling factor varies as the average offset and slope change. In practical terms, the damping factor $K_D$ depends not only on whether the average offset is positive or negative, but also on whether the positive or negative average offset is becoming more positive or more negative.

Figure 9B:
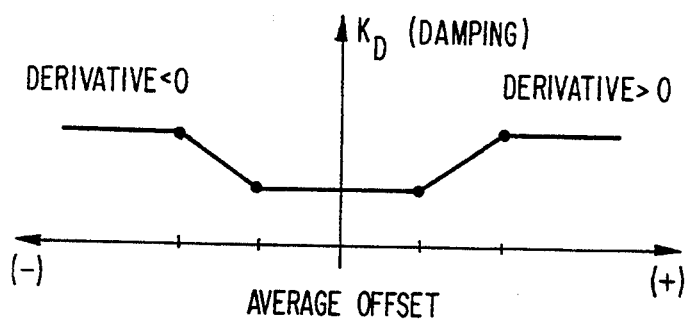
FIG. 9B and 9C illustrate a graph of damping constants used in the non-linear controller of FIG. 9A.
Figure 9C:
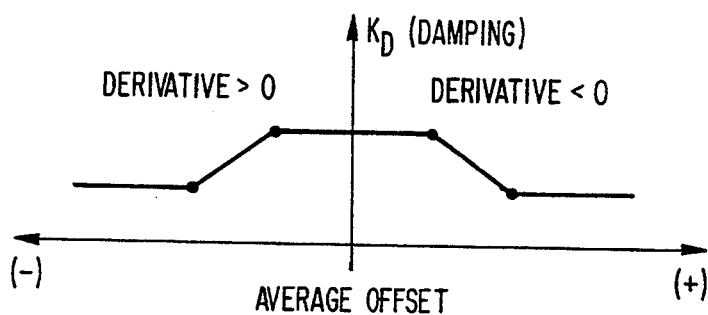

FIGS. 9B and 9C graphically illustrate the value for the damping scaling factor $K_D$ 25'. In FIG. 9B, the average offset and average slope have the same signs, which means that the average offset is positive and becoming more positive with time, or that the average offset is negative and becoming more negative with time. On the other hand, in FIG. 9C, the average offset and average slope have the opposite signs. Therefore, FIG. 9C represents the situation where a positive average offset is becoming less positive with time, or a negative average offset is becoming less negative with time.

Figure 9D:
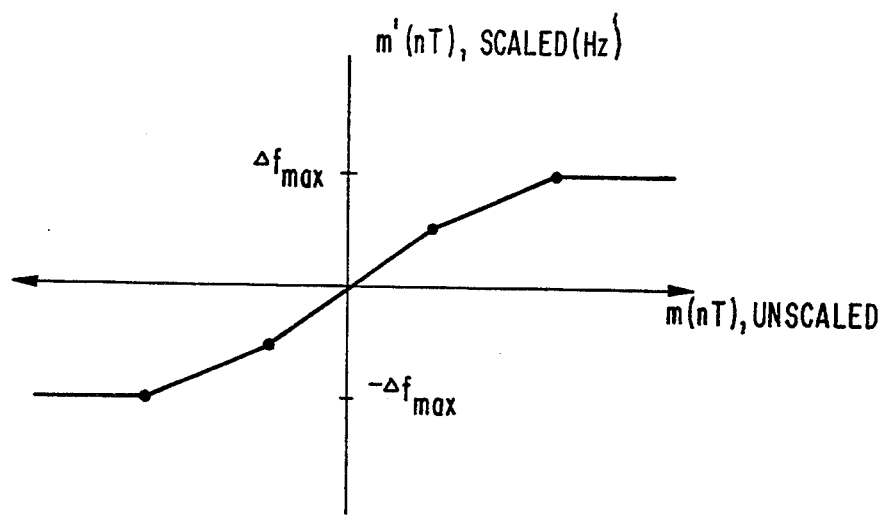
FIG. 9D illustrates a graph of an application curve used in the non-linear controller of FIG. 9A.

The application curve 27, an example of which is shown in FIG. 9D, converts and scales the frequency adjustment signal m(nT), which is the equivalent of Equation 1, to a change of frequency m'(nT) (Hz). Variations of the signal m(nT) around the origin demand a lesser frequency adjustment than variations farther away from the origin.

Figure 10:
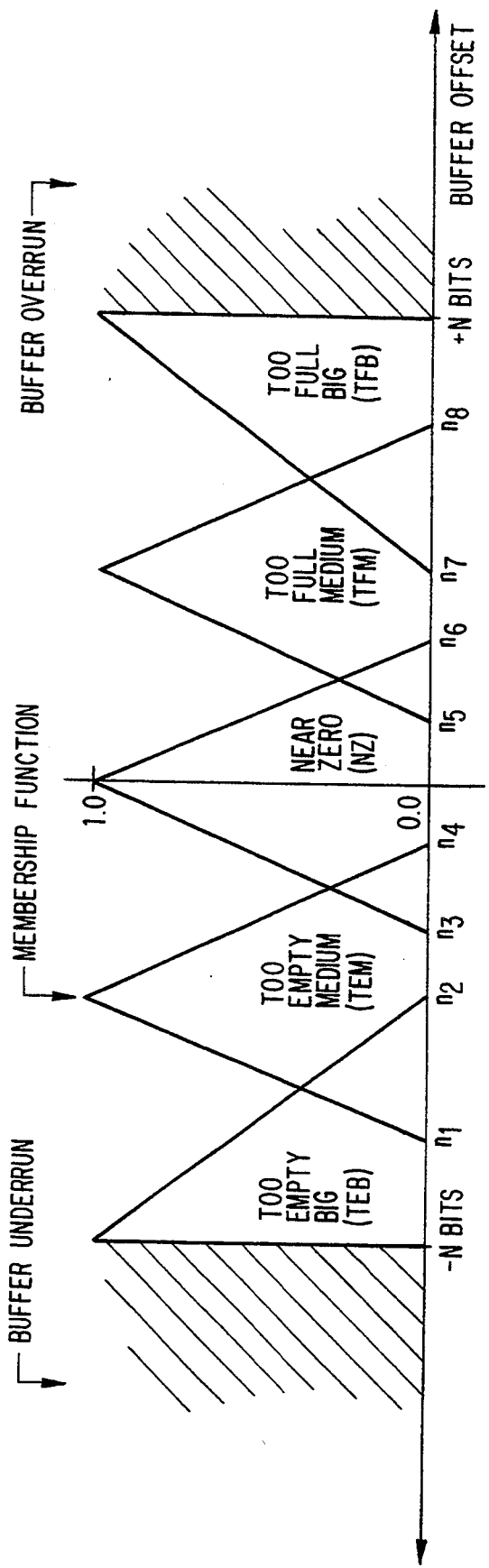
FIG. 10 shows graphically fuzzy sets for use in a fuzzy logic controller.

The third method of implementation relates to a fuzzy logic controller. As in the two previous implementations, in step 107, the average offset and average slope (i.e., the rate of change) are calculated. For the fuzzy logic implementation, these values are referred to as decision variables. Next, in step 108, the decision variables are classified into their respective fuzzy sets corresponding to the degree in which they differ from the target values. That is, the decision variables are classified into one of the fuzzy sets, examples of which are "TOO EMPTY BIG," "TOO EMPTY MEDIUM," "NEAR ZERO," "TOO FULL MEDIUM," and "TOO FULL BIG," as shown in FIG. 10. In practical terms, the fuzzy sets provide an easy way of expressing how much data is currently stored in the buffer 1.

The degree of membership in a fuzzy set lies in the range of zero to one, where zero represents the null membership and one represents full membership. It is quite common that any given status value does not have full membership in any one set but has partial membership in a number of fuzzy sets.

Next, the classified variables are evaluated according to a set of rules in the form of "IF ( ), THEN ( )," to decide the action to take such as "SPEED UP A LOT" or "SLOW DOWN A LITTLE." For example, a rule may be of the specific form "IF ((average offset equals $A_1$) AND (average slope equals $A_2$)) THEN (frequency adjustment equals $A_3$)." Variables $A_1$, $A_2$, and $A_3$ are simply design parameters which will change according to the application. Accordingly, the DDS circuit 7 would be adjusted by an amount indicated by the frequency adjustment A3.

The action rule may also be translated into a frequency adjustment or tuning word (in Hz) by using a degree of membership weighing of the decision variables. For example, if the degree of membership for "TOO EMPTY BIG" (TEB) is 0.5, and the degree of membership for "TOO EMPTY MEDIUM" (TEM) is 0.8, then the resulting change is determined by the following:

[(0.5 * (A3 of TEB))+(0.8 * (A3 of TEM)]/2

Finally, the process proceeds to step 109 where the newly calculated tuning word is applied to the DDS circuit 7.

Figure 11:
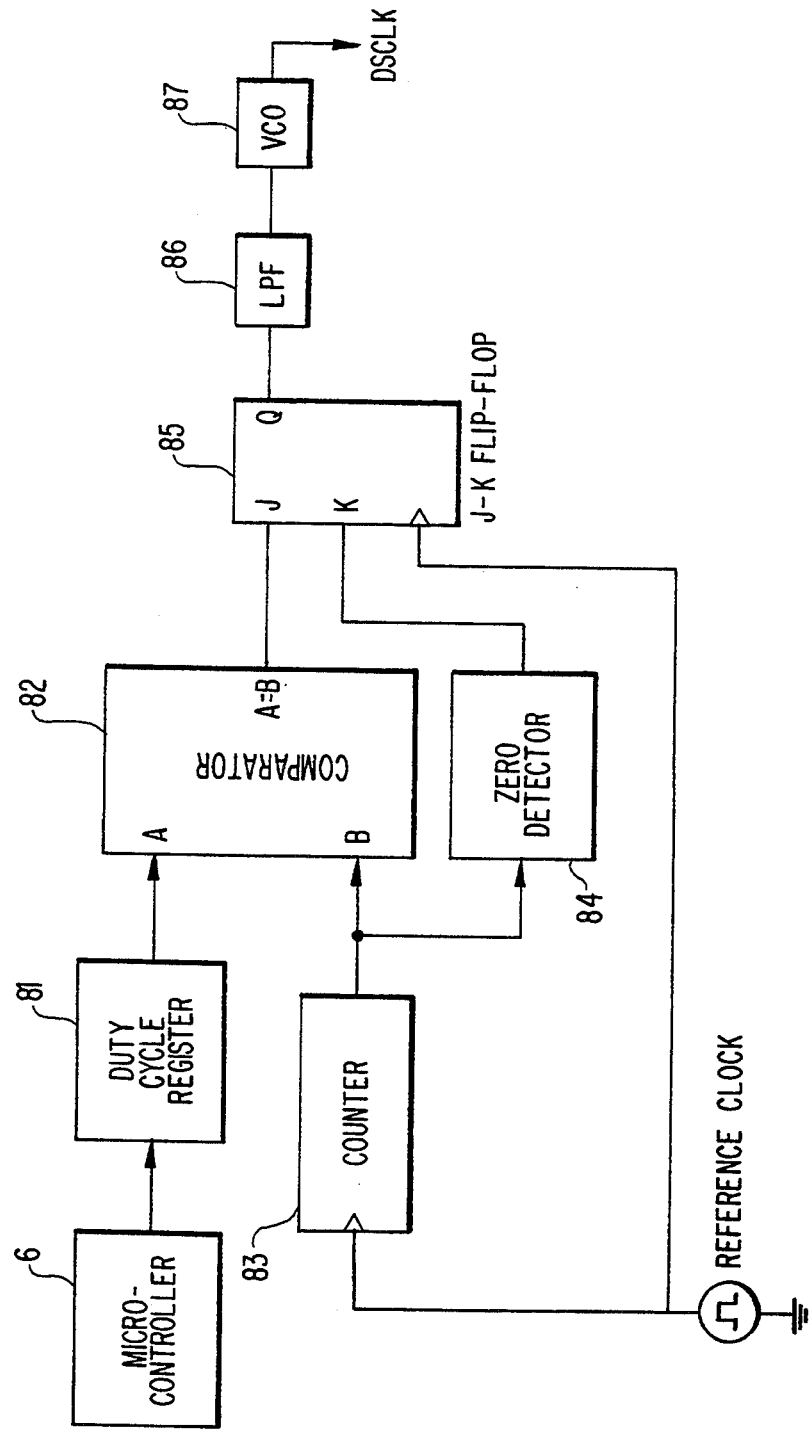
FIG. 11 shows an alternate arrangement of the direct-digital synthesizer of FIG. 5.

In an alternative embodiment, the DDS circuit 7 shown in FIG. 3 can be replaced by a digitally controlled voltage controlled oscillator (VCO), as shown in FIG. 11. The VCO, which is controlled by a signal PHASE CLOCK, puts out the desynchronized clock signal DSCLK. The frequency of the desynchronized clock DSCLK is adjusted according to the duty cycle of the signal PHASE CLOCK.

With specific reference to FIG. 11, the microcontroller 6 outputs the signal PHASE CLOCK with a calculated duty cycle to the duty cycle register 81. The output of the duty cycle register 81 is applied to a first input A of a comparator 82. A second input B of the comparator 82 is coupled to an output of a counter 83. The output of the counter 83 is also coupled to an input of a zero detector 84. An output A=B of the comparator 82 is applied to a first input J of a JK flip-flop 85, whose second input K is coupled to an output of the zero detector 84. Both the counter 83 and JK flip-flop have clock inputs which are coupled to the reference clock. An output Q of the JK flip-flop is coupled to a low-pass filter 86, whose output is applied to the VCO 87. Finally, the output of the VCO 87 supplies the desynchronized clock DSCLK.

In operation, the microcontroller 6 applies a signal to the duty cycle register 81 with a calculated duty cycle. When the input A equals the input B of the comparator 82, the output A=B is asserted, causing the output Q of the JK flip-flop 85 to be asserted high. When the counter 83 rolls over to zero, the zero detector 84 clears the JK flip-flop. The low-pass filter 86 smooths the output Q of the JK flip-flop to a DC level, which is then applied to the VCO.

For example, if the counter 83 counts a cycle of eight (zero to seven), and the microcontroller 6 signals to the duty cycle register 81 with a value of four, then the output Q of the JK flip-flop will be asserted high for the first half of the reference clock period and will be asserted low for the second half of the reference clock period, which corresponds to a 50% duty cycle.

If a larger value is written to the duty cycle register 81, then the counter must count higher before the output Q is asserted high, which narrows the duty cycle. As a result, the frequency of the VCO will decrease.

Although the above has many applications, the first embodiment employing the DDS circuit 7 is preferred because it can achieve a much higher tuning frequency resolution, and, as a result, less jitter during frequency adjustments in response to pointer hits, for example. Moreover, as stated above, a VCO implementation requires tuning of the normal frequency at the time of manufacture, and for applications, for example, where a SONET SPE payload is converted to a DS-3 signal, the required VCO is relatively expensive.

Figure 12:
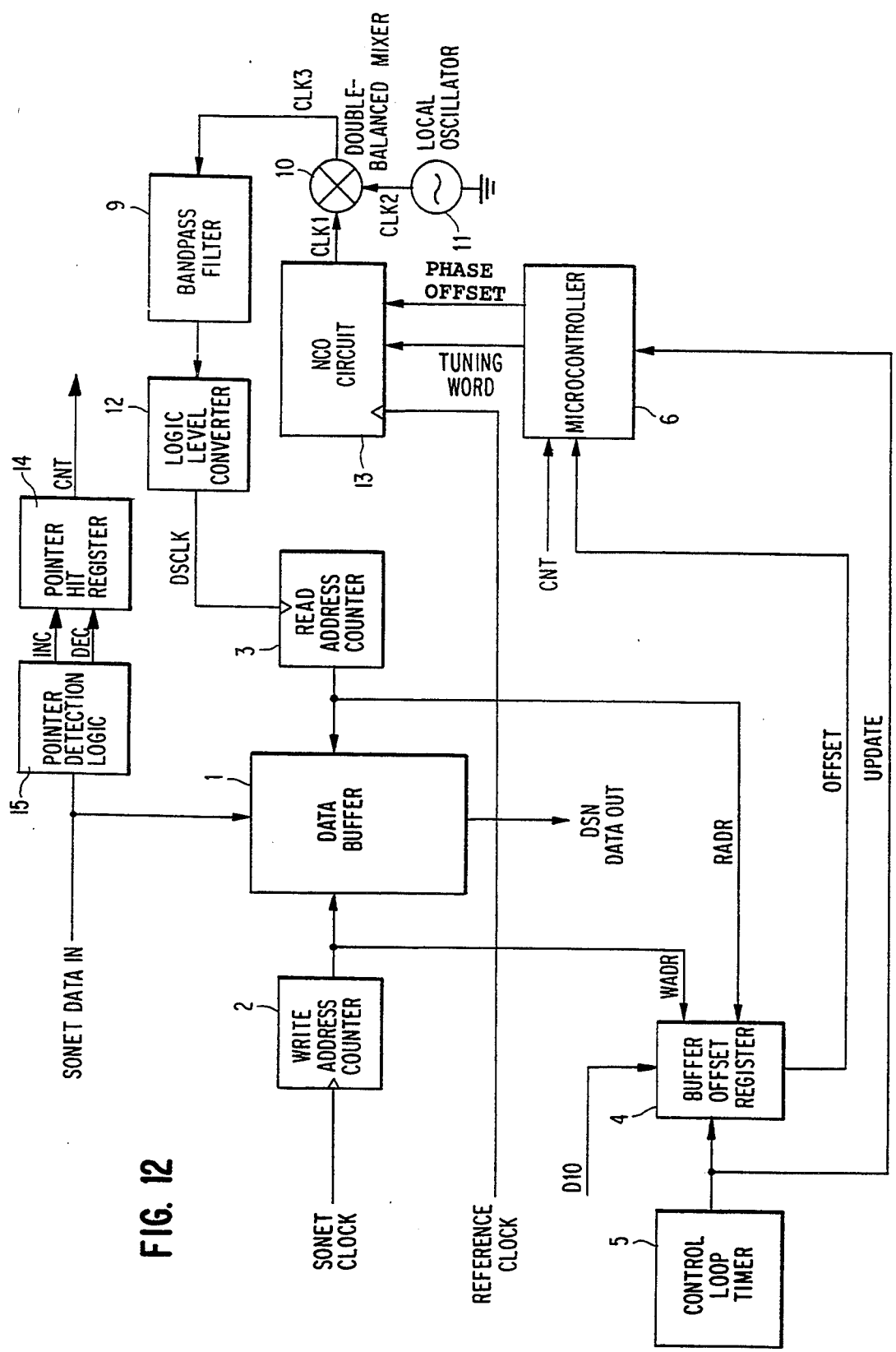
FIG. 12 illustrates a block diagram of a second preferred embodiment of a SONET/DS-N desynchronizer circuit in accordance with the present invention.

FIG. 12 illustrates a block diagram of a SONET/DS-N desynchronizer circuit in accordance with a second embodiment of the present invention. The circuit of the second embodiment is implemented as a discrete-digital control loop. The second embodiment differs essentially from the first embodiment in that the pointer adjustment processing is separated from the SONET SPE payload frequency tracking. That is, according to the second embodiment, the processing of pointers, which indicates a change in the phase of the SPE payload, includes detecting negative or positive pointer hits by monitoring, for example, the H1, H2 bytes in the transport overhead, and advancing or retarding the phase eight UI's over a predetermined period of time. The SONET SPE payload frequency tracking includes detecting positive or negative buffer offsets by monitoring the buffer offset signal OFFSET, and increasing or decreasing, respectively, the tuning word to compensate for the detected positive or negative buffer offset.

The second embodiment will be described with reference to components which are identical to the components of the first embodiment having like reference numerals. For the sake of brevity, the following description will focus on the components and functions unique to the second embodiment.

With specific reference to FIG. 12, the SONET DS-N descynchronizer according to the second embodiment includes a numerically controlled oscillator (NCO) 13, a pointer hit register 14, and a pointer detection logic 15.

The pointer detection logic 15 and pointer hit register 14 monitor the phase of the SPE payload by detecting negative and positive pointer hits based on the H1, H2 bytes in the transport overhead. The pointer hit register 14 maintains a count indicative of the accumulation of both negative and pointer hits over a predetermined period of time.

More specifically, the pointer detection logic 15 receives from the burst of data or the SPE payload that is applied to the input of the data buffer 1 the H1, H2 bytes in the transport overhead. The pointer detection logic detects adjustments to the SPE alignment by monitoring the H1, H2 bytes, and outputs an increment signal INC and a decrement signal DEC to the pointer hit register in response to a positive SPE adjustment and a negative SPE adjustment, respectively. The pointer hit register 14, whose first and second inputs are respectively coupled to the increment signal INC and decrement signal DEC, accumulates a count of the pointer adjustments over a predetermined time interval based on the increment and decrement signals INC and DEC provided by the pointer detection logic 15. The predetermined time interval is determined through either hardware or software control. The pointer hit register 14, in turn, outputs to the microcontroller 6 a count signal CNT which is indicative of the pointer adjustments accumulated over the predetermined time interval.

Figure 13:
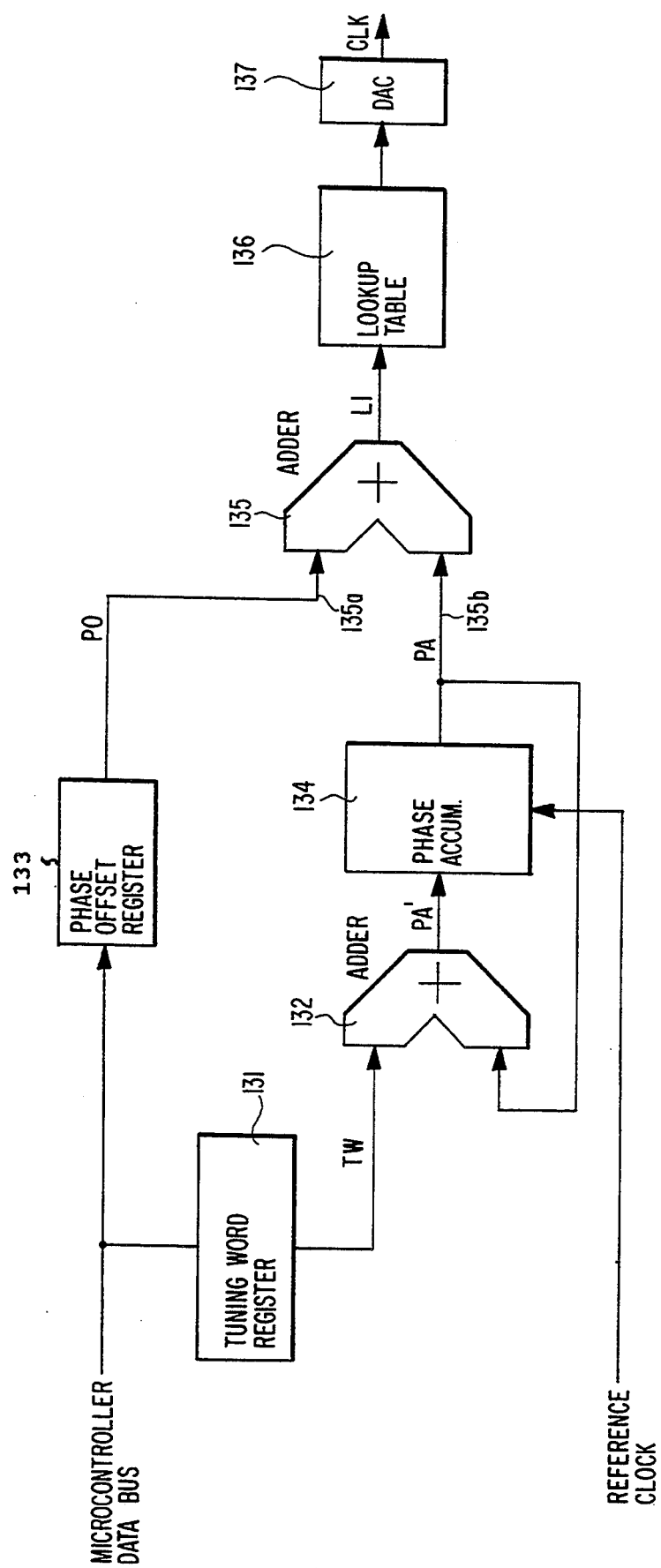
FIG. 13 illustrates a detailed block diagram of the numerically controlled oscillator of FIG. 12.

The NCO 13, which is shown in greater detail in FIG. 13, receives as inputs a tuning word and phase offset from the microcontroller 6, and the reference clock, and outputs a clock signal CLK1 having a first frequency $f_1$. As described above, the tuning word is increased or decreased in response to the offset signal OFFSET, which is generated by the buffer offset register 4. The tuning word thus compensates for positive buffer offsets which occur if the actual payload frequency is greater than the desynchronizer clock DSCLK frequency, and for negative buffer offsets which occur if the actual payload frequency is less than the desynchronizer clock DSCLK frequency. On the other hand, the phase offset is increased or decreased, based on the occurrence of a negative or positive pointer hit, in order to advance or retard the desynchronizer clock DSCLK frequency by eight UI's. In accordance with the tuning word and phase offset, the NCO 13 generates and outputs the clock signal CLK1 to the double-balanced mixer 10.

As described above, the second input of the mixer 10 is coupled to the output of the oscillator 11, which provides the clock signal CLK2 having a frequency of $F_2$. While the frequency of the oscillator output remains constant, the frequency of the output from the NCO 13 is adjusted up or down to compensate for variations in the incoming data rate. The output CLK3 of the mixer 10 is then passed through the bandpass filter 9 and logic level converter 12, which outputs the DSCLK to the read address counter 3.

FIG. 13 illustrates a detailed block diagram of the NCO 13. The NCO 13 is responsive to both the tuning word and the phase offset signals, which are generated by the microcontroller 6. A tuning word register 131, adder 132, and phase accumulator 134 collectively serve to provide a signal, PA, based on the tuning word, to an input 135b of an adder 135. A phase offset register 133 provides a phase offset signal PO to an input 135a of the adder 135. The output LI of the adder 135 is in turn provided to a lookup table 136, whose output represents the clock signal CLK1 in digitized (i.e., numerical) form. The digitized form is converted to an analog waveform by a digital-to-analog converter 137.

The output of the adder 135 continuously varies in accordance with the tuning word TW, the phase offset PO, and the phase accumulator output PA. For the sake of illustration, consider the simple case where the phase accumulator has one degree of arc resolution, so that its allowed values at the output PA of the phase accumulator 135 and the input LI of the lookup table 136 are 0, 1, 2, ..., 359. (It is noted, however, that in practice, the phase accumulator has a much finer degree of resolution. For example, a typical phase accumulator may be 32 bits wide so that $2^{32}$ steps equal 360 degrees. Thus, in this example, the resolution is $360/2^{32}$.) Hence, the adders 132 and 135 perform modulo 360 arithmetic. If the tuning word equals 5 and the phase offset equals 1, the paired sequences (i.e., the phase accumulator output PA and table lookup input LI) at each cycle of the reference clock are as follows:

PA: 0, 5, 10, 15, 20, ..., 355, 0, ...

LI: 1, 6, 11, 16, 21, ..., 356, 1, ...

In this situation, the rate of phase change or frequency is the same for each output of the adder 135. Thus, the incremental change in phase from sample to sample is five degrees. The effect of the phase offset register 133 enables an instantaneous one-time change to the rate of the phase change between the periods of the reference clock. For example, if the phase offset value is changed from zero to one between the second and third clock cycles, then the paired sequences would be as follows:

PA': 0, 5, 10, 15, 20, ..., 355, 0, ...

PA: 0, 5, 11, 16, 21, ..., 356, 1, ...

Here, the phase offset increased after the third clock from 5 degrees to 11 degrees instead of from 5 degrees to 10 degrees, so that the clock output CLK1 of the NCO is advanced one degree ahead. Thereafter, however, each phase increment is five, just as before (i.e., 11, 16, 21, ... ), so that the frequency of the clock CLK1 remains unchanged. Increasing the phase offset in this manner has the effect of advancing the phase of the waveform in time, as illustrated in FIGS. 14b and 14d. FIG. 14b shows an advanced phase adjustment, and should be contrasted with FIG. 14a and 14c, which illustrates no phase adjustments. A sequence of such small phase advances could be performed in response to a negative pointer hit in the Synchronous Payload Envelope.

Based on the foregoing description and example, it is apparent to one of ordinary skill in the art that the phase could also be retarded. For instance, if the tuning word equals 5 and the phase offset is initially 0 degrees, to retard the phase by one degree at the third clock cycle the phase offset is changed to 359 (which is the result of subtracting 1 from 0 using modulo 360 arithmetic), yielding:

PA': 0, 5, 10, 15, 20, ..., 355, 0, 5, ...

PA: 0, 5, 9, 14, 19, ..., 354, 359, 4, ...

The phase is advanced only 4 degrees from the second to the third clock cycle, but is advanced 5 degrees at every cycle thereafter (i.e., 9, 14, 19, ... ). Again, the result at the third cycle is the mod 360 sum of TW, PA and PO; that is, (5+5+359) modulo 360 equals 9. The effect of decreasing the phase offset in this manner is shown in FIGS. 15b and 15d, which illustrates retarding of the phase; FIGS. 15a and 15c illustrating no phase adjustments. A sequence of such small phase retards could be performed in response to a positive pointer hit in the Synchronous Payload Envelope.

The second embodiment as illustrated in FIGS. 12 and 13 and as described above, provides for a manner of separately processing offsets in the elastic store of the buffer 1 due to discrepancies in the actual payload frequency and the desynchronized clock DSCLK frequency, and pointer adjustments due to a phase change in the SONET SPE payload. In other words, there are two components, namely, a phase adjustment and a frequency adjustment. The phase adjustment reacts to SPE pointer adjustments, and the latter reacts to the payload's S-bit stuffing ratio. The S-bit stuffing ratio is a function of the line rate of the signal source at the far-end terminal's synchronizer. Further, because phase adjustments and frequency adjustments are performed separately and independent thereof, it is possible that the sampling rates and time constants for performing the frequency and phase adjustments be rather different.

The discrete-digital control loop according to the second embodiment is controlled primarily by the microprocessor and the associated firmware and control logic. In general, for both phase adjustments and frequency adjustments, the microcontroller 6 periodically samples decision variables, calculates the adjustments, and updates the appropriate control variables.

For phase adjustments, the decision variable is provided by the pointer hit register 14 through the signal CNT, and the control variable is the phase offset value, which is supplied by the microcontroller 6 to the NCO 13 and stored in the phase offset register 133.

In operation, the pointer detection logic 15 detects pointer hits and provides to the pointer hit register 14 increment and decrement signals INC and DEC in order for the pointer hit register 15 to accumulate a count of pointer adjustments. Based on the output of the pointer register 14, the microcontroller outputs a phase offset signal to the NCO 13, whose output is advanced or retarded accordingly. That is, the phase is advanced in response to a negative pointer adjustment, and is retarded in response to a positive pointer adjustment. During the processing, the tuning word is not affected and the tuning word register contents are not changed so that the NCO frequency remains constant.

Periodically, the microprocessor reads the pointer hit register 14 to obtain the current count value. The register 14 is then reset to zero. Each pointer hit requires phase adjustment of 8-bit clocks in terms of magnitude to the desynchronizer clock DSCLK. In order to limit the output jitter, this adjustment is spread out over time. The algorithm thus calculates two variables including the length of time over which the 8-bit adjustment is spread out, and the magnitude of each individual phase adjustment.

The algorithmic calculations can be made according to a linear or non-linear function as desired.

For frequency adjustments, the decision variable is the offset signal OFFSET provided by the buffer offset register 4, and the control variable is the tuning word which is supplied to the NCO 13 by the microcontroller.

Due to compensation for pointer adjustments a sudden increase or decrease of 8-bits in the offset can occur. The offset value must therefore be processed to remove this effect before it is used to calculate or update the tuning word. This effect, which is termed "phase hit residue," is subtracted over time from each buffer offset reading. The buffer offset is calculated as follows:

OFFSET'=OFFSET−(8×pointer hit residue)

wherein OFFSET'is simply the signal OFFSET with the pointer hit residue removed.

The residue is a value that decreases in time as the phase adjustment process "leaks off" recent pointer hits. Thus, when a pointer hit occurs, eight bits should be subtracted from or added to, depending upon the polarity of the adjustment, the offset value. However, when the phase adjustment has adjusted for one bit of the pointer, for example, seven bits will then be added to or subtracted from the offset reading. Hence, the residue is adjusted downward over time in concert with the phase adjustment period.

As described above, the buffer offset register 4 determines the difference between the write address counts and the read address counts at predetermined times. The microcontroller periodically reads the buffer offset register, calculates a new offset value by removing the pointer hit residue, and increases or decreases the tuning word to increase or decrease the frequency as needed to maintain the buffer offset as close as possible to zero. When the buffer offset remains at zero or very close to zero, the desynchronizer clock DSCLK frequency is considered to be matched to that of the far-end signal source's line rate.

The frequency adjustment loop can be something along the lines of a linear proportional-integral (PID) controller or some sort of non-linear controller.

There has thus been shown and described a novel SONET/DS-N desynchronizer which fulfills all the objects and advantages sought therefor. Many changes, modifications, variations, and other uses and applications of the subject invention will, however, become apparent to those skilled in the art after considering the specification and the accompanying drawings which disclose preferred embodiments thereof. All such changes, modifications, variations, and other uses and applications which do not depart from the spirit and scope of the invention are deemed to be covered by the invention, which is limited only by the claims which follow.

What is claimed is:

1. An apparatus for receiving a stream of SONET data comprised of overhead information including positive and negative pointer adjustments and a SONET SPE payload for desynchronizing the SONET SPE payload to a DS-N type data, comprising:

first counting means for generating a first count in synchronism with a first clock having a first frequency;

second counting means for generating a second count in synchronism with a desynchronized clock having a second frequency;

buffer means, coupled to said first and second counting means, for storing said SONET SPE payload at a location corresponding to said first count in synchronism with said first clock, and for outputting DS-N type data from a location corresponding to said second count in synchronism with said desynchronized clock;

offset means, coupled to said first and second counting means, for determining a difference between said first count and said second count, and for outputting an offset signal representative thereof;

pointer adjustment means, responsive to said overhead information and said positive and negative pointer adjustments, for monitoring said positive and negative pointer adjustments which respectively indicate the reception of said SONET SPE payload after and before a nominal time, and for outputting a count signal representative of the pointer adjustments accumulated over a predetermined period of time;

clock generating means, responsive to a control signal, for generating said desynchronized clock; and control means, coupled to said offset means and pointer adjustment means, for generating said control signal in response to said offset signal and said count signal so as to adjust said second frequency of said desynchronized clock such that said difference between said first and second count is maintained at a predetermined value.

2. The apparatus as recited in claim 1, wherein said control means comprises a numerically controlled oscillator for generating said control signal.

3. The apparatus as recited in claim 2, wherein said pointer adjustment means comprises means for producing a phase offset indicative of occurrences of negative and positive pointer adjustments, and wherein said numerically controlled oscillator comprises:

a first register for receiving and storing said phase offset generated by said pointer adjustment means;

a second register for receiving and storing a tuning word generated by said offset means;

a phase accumulator, coupled to an output of said second register, for accumulating changes to said tuning word;

combining means, coupled to an output of said first register and said phase accumulator, for outputting said control signal in accordance with variations in said outputs of said first register and said phase accumulator.

4. The apparatus as recited in claim 3, wherein said combining means comprises an adder for adding said output of said first register and said output of said phase accumulator; and a lookup table, coupled to an output of said adder, for outputting a digitized form of said control signal.

5. The apparatus as recited in claim 4, wherein said control means further comprises a digital-to-analog converter, coupled to an output of said combining means, for converting said control signal from digital form to analog form.

6. The apparatus as recited in claim 5, wherein said control means further comprises a microcontroller.

7. The apparatus as recited in claim 1, wherein said pointer adjustment means comprises first means for receiving byte pointer adjustment signals representing increases and decreases in pointer adjustments, and second means, coupled to an output of said first means, for counting the number of increases and decreases in pointer adjustments over a predetermined period of time, wherein said output of said second means constitutes said count signal.

8. The apparatus as recited in claim 7, wherein said pointer adjustments are represented by H1 and H2 bytes in the transport overhead section of said SONET data.

9. The apparatus as recited in claim 1, wherein said offset means comprises:

counting means for counting at a predetermined rate when a first pulse is generated, wherein an output of said counting means constitutes said offset signal;

register means for latching said first count when said first pulse is generated; and means for comparing said second count with said first count and outputting a signal when said second count equals said first count to stop said counting means from counting.

10. The apparatus as recited in claim 1, wherein said clock generating means comprises:

an oscillator for generating a signal having a predetermined frequency; and a mixer for producing said desynchronized clock having said second frequency which is equal to the sum of a variable frequency and said predetermined frequency, wherein said control signal is varied to adjust said variable frequency such that said second frequency of said desynchronized clock is adjusted to maintain the difference between said first count and said second count at a predetermined value.

11. An apparatus for receiving a stream of SONET data comprised of overhead information including positive and negative pointer adjustments and a SONET SPE payload for desynchronizing the SONET SPE payload to a DS-N type data, comprising:

first clock means for generating a first clock having a first frequency;

second clock means for generating a desynchronized clock having a second frequency;

buffer means, coupled to said first and second clock means, for storing said SONET SPE payload in synchronism with said first clock, and for outputting DS-N type data in synchronism with said desynchronized clock;

offset means for determining a degree of fullness of said buffer, and for outputting an offset signal representative thereof;

pointer adjustment means, responsive to said overhead information and said positive and pointer adjustments, for monitoring said positive and negative pointer adjustments, which respectively indicate the reception of said SONET SPE payload after and before a nominal time, and for outputting a count signal representative of the pointer adjustments accumulated over a predetermined period of time; and control means, coupled to said offset means and pointer adjustment means, for generating a control signal in response to said offset signal and said count signal so as to vary said second frequency of said desynchronized clock such that said buffer maintains a predetermined degree of fullness.

12. The apparatus as recited in claim 11, wherein said pointer adjustment means comprises first means for receiving byte pointer adjustment signals representing increases and decreases in pointer adjustments, and second means, coupled to an output of said first means, for counting the number of increases and decreases in pointer adjustments over a predetermined period of time, wherein said output of said second means constitutes said count signal.

13. The apparatus as recited in claim 12, wherein said pointer adjustments are represented by H1 and H2 bytes in the transport overhead section of said SONET data.

14. The apparatus as recited in claim 11, wherein said control means comprises a numerically controlled oscillator for generating said control signal.

15. The apparatus as recited in claim 14, wherein said pointer adjustment means comprises means for producing a phase offset indicative of occurrences of negative and positive pointer adjustments, and wherein said numerically controlled oscillator comprises:

a first register for receiving and storing said phase offset generated by said pointer adjustment means;

a second register for receiving and storing a tuning word generated by said offset means;

a phase accumulator, coupled to an output of said second register, for accumulating changes to said tuning word;

combining means, coupled to an output of said first register and said phase accumulator, for outputting said control signal in accordance with variations in said outputs of said first register and said phase accumulator.

16. The apparatus as recited in claim 15, wherein said combining means comprises an adder for adding said output of said first register and said output of said phase accumulator; and a lookup table, coupled to an output of said adder, for outputting a digitized form of said control signal.

17. The apparatus as recited in claim 16, wherein said control means further comprises a digital-to-analog converter, coupled to an output of said combining means, for converting said control signal from digital form to analog form.

* * * * *

UNITED STATES PATENT AND TRADEMARK OFFICE
CERTIFICATE OF CORRECTION

PATENT NO.   : 5,390,180
DATED        : February 14, 1995
INVENTOR(S)  : Brian F. Reilly It is certified that error(s) appears in the above-identified patent and that said Letters Patent is hereby corrected as shown below:

Column 1,   line 53,   delete "," after "second";

line 54,   delete "," after "frame".

Signed and Sealed this

Eighteenth Day of July, 1995

Attest:

BRUCE LEHMAN

Attesting Officer

Commissioner of Patents and Trademarks